US008507846B2

(12) United States Patent
Chen et al.

(10) Patent No.: US 8,507,846 B2
(45) Date of Patent: Aug. 13, 2013

(54) STEP-SCAN ION TRAP MASS SPECTROMETRY FOR HIGH SPEED PROTEOMICS

(75) Inventors: Chung-Hsuan Chen, Taipei (TW); Jung-Lee Lin, Banqiao (TW); Ming-Lee Chu, Xizhi (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 13/566,352

(22) Filed: Aug. 3, 2012

(65) Prior Publication Data

US 2013/0032709 A1 Feb. 7, 2013

Related U.S. Application Data

(60) Provisional application No. 61/515,681, filed on Aug. 5, 2011.

(51) Int. Cl.
*B01D 59/44* (2006.01)
*H01J 49/00* (2006.01)

(52) U.S. Cl.
USPC ........... 250/282; 250/281; 250/283; 250/287; 250/288; 250/290; 250/291; 250/292

(58) Field of Classification Search
USPC .................. 250/281–283, 287, 288, 290–292
See application file for complete search history.

(56) References Cited

U.S. PATENT DOCUMENTS

| | | | | |
|---|---|---|---|---|
| RE34,000 | E | 7/1992 | Syka | |
| 5,347,127 | A | 9/1994 | Franzen | |
| 6,777,673 | B2 | 8/2004 | Chang | |
| 6,781,119 | B2 | 8/2004 | Smith | |
| 6,847,037 | B2 * | 1/2005 | Umemura | 250/292 |
| 7,521,674 | B2 | 4/2009 | Pau | |
| 7,714,623 | B2 | 5/2010 | Reilly | |
| 2009/0072136 | A1 * | 3/2009 | Pringle et al. | 250/290 |
| 2009/0121123 | A1 * | 5/2009 | Giles et al. | 250/282 |
| 2011/0147581 | A1 | 6/2011 | Chen | |
| 2013/0001415 | A1 * | 1/2013 | Chen et al. | 250/283 |

* cited by examiner

*Primary Examiner* — Nikita Wells
*Assistant Examiner* — Meenakshi Sahu
(74) *Attorney, Agent, or Firm* — Eckman Basu LLP

(57) ABSTRACT

An ion trap mass spectrometer and methods for obtaining a mass spectrum of ions by step scanning the driving frequency in frequency increments over a bandwidth, wherein for each step a specific frequency is held for a fixed number of complete cycles, wherein each specific frequency is changed continuously to the frequency in the next step, and wherein each specific frequency in each step starts at phase zero position.

22 Claims, 7 Drawing Sheets

FIG. 4 Sequence controller

STEP-SCAN ION TRAP MASS SPECTROMETRY FOR HIGH SPEED PROTEOMICS

CROSS REFERENCE TO RELATED APPLICATIONS

This application claims the benefit of U.S. Provisional Application No. 61/515,681, filed Aug. 5, 2011, which is hereby incorporated by reference in its entirety.

BACKGROUND OF THE INVENTION

Mass spectrometry is a powerful tool for identifying a molecule or ion by its mass-to-charge ratio. A limitation of mass spectrometry is the difficulty of rapidly measuring biomolecules or macromolecules of high mass-to-charge ratio. Recent advances in the detection of large biomolecules include matrix-assisted laser desorption/ionization (MALDI) and electrospray ionization (ESI).

Mass spectrometry has been applied to the study of proteins, organelles, and cells to characterize molecular weight, as well as to study products of protein digestion, proteomic analysis, metabolomics, and peptide sequencing, among other things. Ion trapping devices and methods such as three-dimensional quadrupole ion traps have been useful for proteomics in general because they provide mass-selective ejection of ions from the trap.

In brief, mass-selective ejection of ions from a trap can be done by frequency-scanning a resonant LC circuit of the mass spectrometer in which the ion trap is the capacitor. The frequency sweep can be made to correspond to a range of mass to charge ratios for the detected ions.

A drawback of mass-selective ejection of ions from a trap by frequency-scanning methods is that when sweeping over a frequency range, no specific frequency is completed over an entire cycle before changing to the next frequency. Moreover, each successive frequency in the sweep begins at an arbitrary phase. These drawbacks reduce the resolution of the mass spectrum and the correspondence of the frequency to the mass to charge ratio.

There is a continuing need for methods for detecting proteins and biomolecules using a mass spectrometer. There is also a need for an apparatus and arrangement for a mass spectrometer that can detect large biomolecular ions. There is a further need for a mass spectrometer apparatus and methods capable of detecting biomolecules rapidly at high resolution for studies in proteomics.

BRIEF SUMMARY OF THE INVENTION

This invention relates to the fields of mass spectrometry and proteomics. In particular, this application relates to methods for high speed proteomics and detecting large biomolecular ions in mass spectrometry. More particularly, this application relates to frequency step-scanning devices and methods for ion trap mass spectrometry for detecting macromolecules and biomolecules.

Embodiments of this invention can provide methods for detecting proteins and biomolecules using a mass spectrometer. This disclosure also provides an apparatus and arrangement for a mass spectrometer that can detect large biomolecular ions. Embodiments of this disclosure may further provide a mass spectrometer apparatus and methods capable of detecting biomolecules rapidly at high resolution for studies in proteomics.

In some aspects, this disclosure provides methods for obtaining a mass spectrum of ions with a quadrupole ion trap mass spectrometer by step scanning the trapping frequency in frequency increments over a bandwidth, wherein for each step a specific frequency is held for a fixed number of complete cycles, wherein each specific frequency is changed continuously to the frequency in the next step, and wherein each specific frequency in each step starts at phase zero position. In some embodiments, the fixed number of complete cycles may be from 10 to 1,000,000. In certain embodiments, the frequency increment can be from 1 to 256 Hz.

In further embodiments, the methods include step scanning the ion trap axial excitation RF frequency in frequency increments over a bandwidth, wherein for each step a specific axial frequency is held for a fixed number of complete cycles, wherein each specific axial frequency is changed continuously to the axial frequency in the next step, and wherein each specific axial frequency in each step starts at a phase zero position.

In further embodiments, the ions can be ionized molecules or fragments of a larger molecule or structure selected from macromolecules, biomolecules, organic polymers, nanoparticles, proteins, antibodies, protein complexes, protein conjugates, nucleic acids, oligonucleotides, DNA, RNA, polysaccharides, viruses, cells, and biological organelles. In certain embodiments, the ions may have a mass of from about 1 kDa to about 200 kDa.

Embodiments of this invention may further provide methods for obtaining a mass spectrum of ions by trapping the ions in a quadrupole ion trap comprising a center-ring electrode and two end-cap electrodes, then applying a first specific frequency of RF to the center-ring electrode for a first number of complete cycles of the first specific frequency of RF, applying a second specific frequency of RF to the center-ring electrode for a second number of complete cycles of the second specific frequency of RF, wherein the second specific frequency of RF is applied beginning at phase zero, and wherein the second specific frequency of RF differs in frequency from the second specific frequency of RF by an amount $\Delta f_1$.

The methods may further include additional steps of applying a specific frequency of RF to the center-ring electrode for a number of complete cycles of the specific frequency of RF, wherein each additional specific frequency of RF is applied beginning at phase zero, and wherein the each additional specific frequency of RF differs in frequency from the previous specific frequency of RF by an amount $\Delta f_n$. In some embodiments, the first and second number of complete cycles may each independently be from 10 to 1,000,000. In certain embodiments, the incremental amounts $\Delta f_1$ and $\Delta f_n$ can each, independently be from 1 to 256 Hz.

In further embodiments, the ions may be generated by MALDI, electrospray ionization, laser ionization, thermospray ionization, thermal ionization, electron ionization, chemical ionization, inductively coupled plasma ionization, glow discharge ionization, field desorption ionization, fast atom bombardment ionization, spark ionization, or ion attachment ionization.

In some aspects, this invention includes an ion trap mass spectrometer for obtaining a mass spectrum of ions. The ion trap mass spectrometer may include a three dimensional quadrupole ion trap, a sequence controller comprising a programmable waveform generator for synthesizing a step scan waveform of a driving or trapping frequency in frequency increments over a bandwidth, wherein for each step a specific frequency is held for a fixed number of complete cycles, wherein each specific frequency is changed continuously to the frequency in the next step, and wherein each specific frequency in each step starts at phase zero position, and a charge detector.

The methods may further include applying a first specific axial frequency of RF to the end cap electrodes for a first number of complete cycles of the first specific axial frequency of RF; and applying a second specific axial frequency of RF to the end cap electrodes for a second number of complete cycles of the second specific axial frequency of RF, wherein the second specific axial frequency of RF is applied beginning at phase zero, and wherein the second specific axial frequency of RF differs in frequency from the first specific frequency of RF by an amount $\Delta f_1$.

In the following description, reference is made to the accompanying drawings that form a part hereof, and in which is shown by way of illustration specific embodiments which may be practiced. These embodiments are described in detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

DETAILED DESCRIPTION OF THE INVENTION

Embodiments of this invention provide novel methods in mass spectrometry for the study of proteins, organelles, and cells to characterize molecular weight, products of protein digestion, proteomic analysis, metabolomics, and peptide sequencing, among other things.

This disclosure provides novel ion trapping, ejection and detection methods for mass spectrometry using a three-dimensional quadrupole ion trap that are useful for proteomics studies.

A three-dimensional (3D) quadrupole ion trap can include two hyperbolic surface end caps and one hyperbolic surface center-ring. An ion introduced into the trap space can be trapped between the center-ring and the end-caps. Conditions for stability of a trapped ion's trajectory in a Paul quadrupole ion trap are described by the equations:

$$\phi_0 = U + V\cos\Omega t \qquad \text{Equation 1}$$

where $\phi_0$ is the applied electric potential on the center-ring electrode, V cos Ωt is the RF potential, Ω is the angular driving frequency of the alternating voltage supply, V is the AC amplitude (0-peak) on the center-ring electrode, and U is the DC potential on the center-ring electrode, and $$q_z = \frac{8eV}{m(r_0^2 + 2z_0^2)\Omega^2} \qquad \text{Equation 2}$$

where $q_z$ is a dimensionless parameter for an ion derived from the Mathieu equations, m is the ion mass, $r_0$ is the geometric size of the ion trap given by the inscribed radius of the ring electrode, and $2z_0$ is the distance between the two end cap electrodes.

For mass analysis of trapped ions, the sinusoidal voltage V can be ramped up to increase $q_z$ to the instability point in an ion-selective ejection process.

Figure 1:
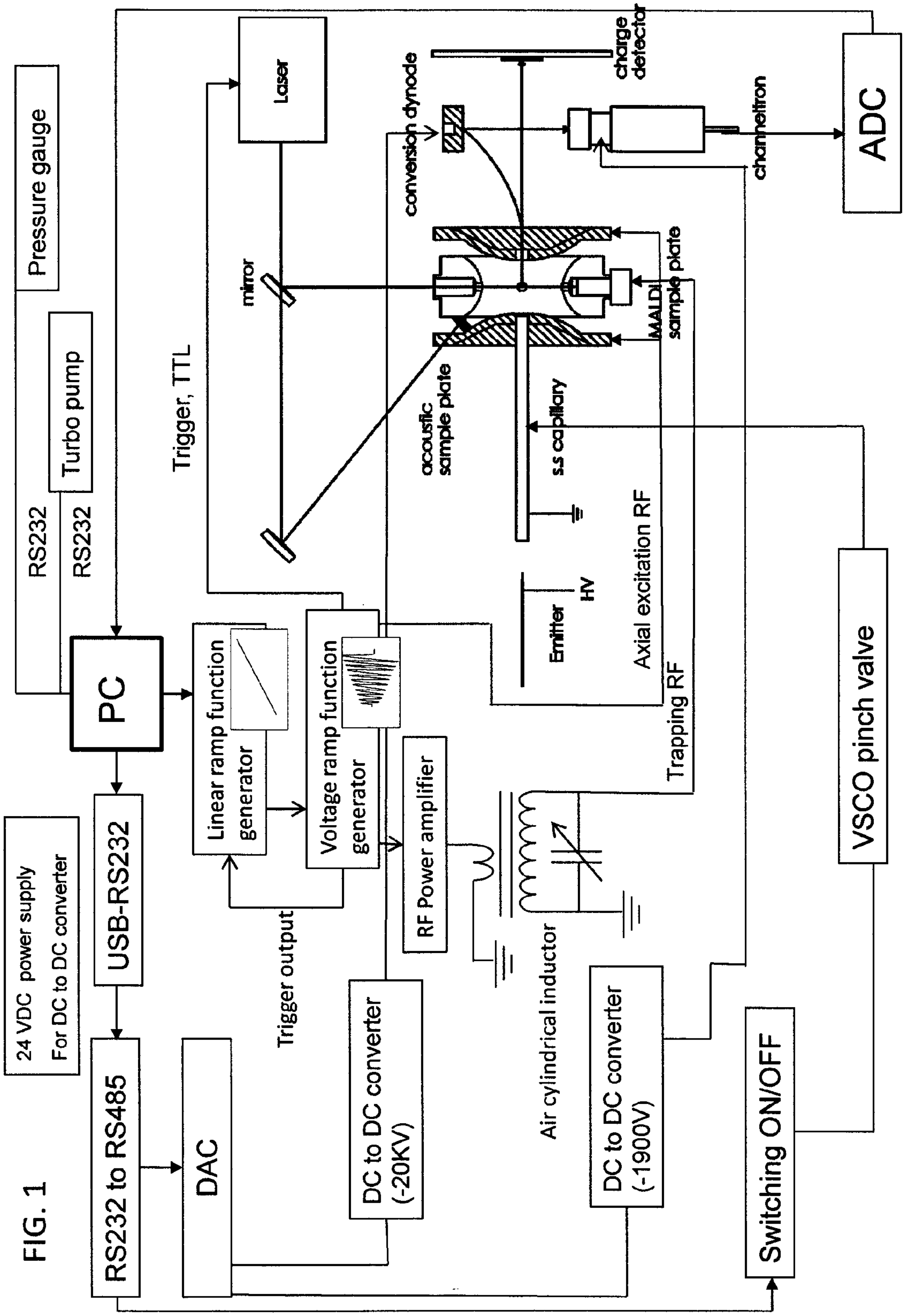
FIG. 1 shows an embodiment of a three dimensional ion trap in a mass spectrometer. The center-ring electrode of the ion trap can be driven at a trapping RF frequency Ω, and the end cap electrodes of the ion trap can be subjected to a supplementary axial excitation RF. A voltage ramp function generator provides an analytical RF for frequency scanning and an axial resonance excitation RF frequency scan.

FIG. 1 shows a resonant circuit of a 3D ion trap mass spectrometer. In the voltage ramping process, the voltage of the sinusoidal waveform V can be amplified by using an LC circuit. An LC circuit is a resonant circuit or tuned circuit that consists of an inductor and a capacitor. When connected together, an electric current can alternate between them in the circuit. It will generate maximum signal at a particular frequency. For the resonant circuit of the mass spectrometer, the 3D ion trap is the capacitor and is connected to a cylindrical air-core coil.

Air core coils have lower inductance than ferromagnetic core coils. Air core coils are useful at high frequencies because they are free from energy losses or core losses that occur in ferromagnetic cores which increase with frequency. The LC circuit can store electrical energy vibrating at its resonant frequency. A capacitor stores energy in the electric field between its plates, depending on the voltage across it, and an inductor stores energy in its magnetic field, depending on the current through it.

According to the Mathieu equations, the LC resonance circuit ramp voltage can be increased to the point at which $q_z$ reaches an unstable region and the ion is ejected from the trap. Because $q_z$ also depends inversely on the mass of the ion, as the mass increases, the voltage required for raising $q_z$ to the ejection point also increases. For large biomolecules and analytes of high molecular weight, the voltage of LC circuit must be raised extremely high which can cause electrical breakdown between the center-ring and the end cap of the ion trap.

In order to avoid electrical breakdown, a frequency scan method can be used for an ion trap. For tuning a specific resonant frequency, the ion trap is coupled with a variable capacitor. The capacitance of the variable capacitor can be controlled mechanically or electronically to obtain the resonance frequency of the LC circuit. When the value of the inductor is fixed, the capacitance of the variable capacitor can be used to obtain a specific resonant frequency in a stepwise scan. However, using a mechanical controller it is difficult to hold a specific frequency for a fixed number of cycles, and then step the specific frequency to the next resonant frequency. With a mechanical controller it is also difficult to step from one resonant frequency to the next resonant frequency with each step beginning at a phase zero position.

To overcome this problem of the LC circuit, a frequency sweep scan method can be used. A linear chirp sinusoidal waveform can be set to increase or decrease in frequency linearly over time. The chirp signal can be generated with analogue electronics via a voltage-controlled oscillator, and a linearly or exponentially varying control frequency. It can also be generated digitally by a digital-to-analog converter (DAC).

In general, for the ion trap the value of U is set equal to zero.

In the frequency sweep scan method of this disclosure the high voltage of the sinusoidal wave is fixed at 400 Volts, or Vpp 800 Volts. This advantageously avoids breakdown discharge between electrodes under high pressure.

Figure 2:
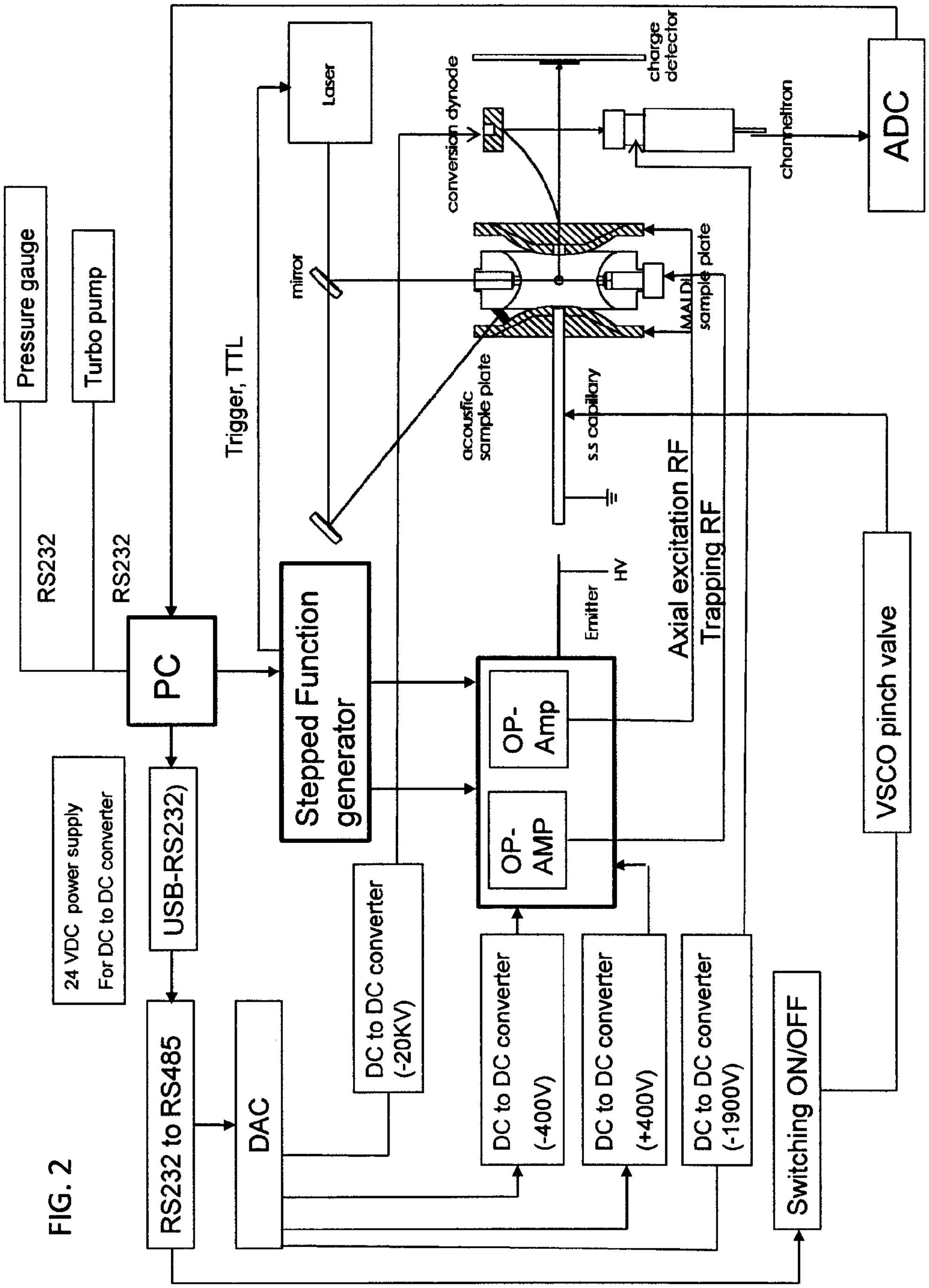
FIG. 2 shows an embodiment of a three dimensional ion trap in a mass spectrometer of this disclosure. The center-ring electrode of the ion trap can be driven at a trapping RF frequency Ω, and the end cap electrodes of the ion trap can be subjected to a supplementary axial excitation RF. A stepped function generator provides an analytical RF stepwise frequency scan and an axial resonance excitation RF stepwise frequency scan.

FIG. 2 shows an embodiment of a three dimensional ion trap mass spectrometer of this disclosure. The center-ring electrode of the ion trap can be driven at a trapping RF frequency Ω, and the end cap electrodes of the ion trap can be subjected to a supplementary axial excitation RF. A stepped function generator provides an analytical RF stepwise frequency scan and an axial resonance excitation RF stepwise frequency scan.

Using a function generator, the frequency can be swept downward in linear sweeps during an adjustable, short time. Ions are trapped by using a high starting frequency, and then are ejected from low mass to high mass by sweeping downward to lower frequency. Thus, the function generator can generate frequency as $\Omega t$ ($\Omega=2\pi f$). The radio frequency is related to the weight of molecular ions.

The output voltage of the function generator may be too low to trap ions directly. The output voltage of the function generator can be amplified with a high voltage power operational amplifier. Output voltages of the operation amplifier from low to high frequency are similar.

According to solutions of the Mathieu equations, when the RF voltage (V) matches the sweep scan, the weight of the molecular ion is related to the RF frequency (Ω).

Figure 3:
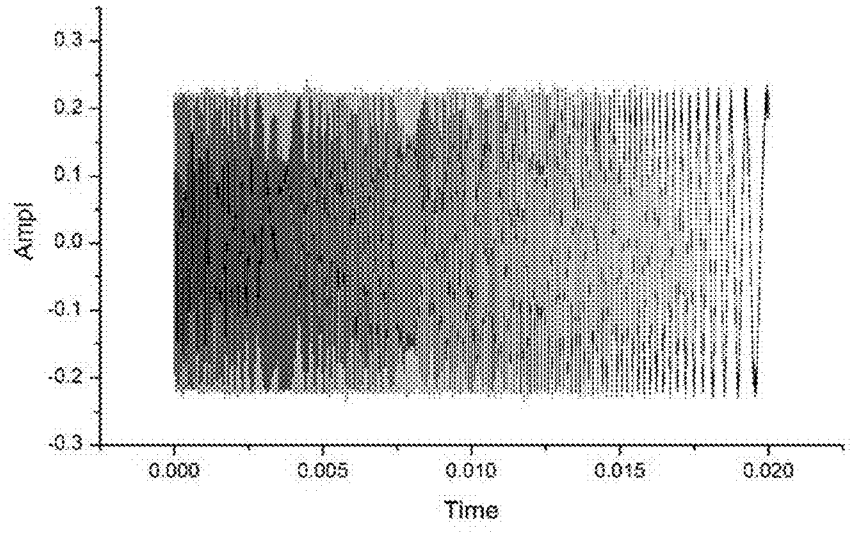
FIG. 3 shows an example of an experimental linear sweep mode using an arbitrary function generator.

For example, a DS345 arbitrary function generator can perform a frequency sweep as shown in FIG. 3. The sweep can be made upward or downward in frequency, and linear or log sweeps can be done. There are no discontinuities or band-switching artifacts when sweeping through certain frequencies. A smooth, phase-continuous sweep over an entire frequency range can be done. A drawback of this frequency sweep is the lack of phase control, in other words, each successive specific frequency begins at an arbitrary phase, and does not begin at phase zero. Another drawback of this frequency sweep is that the control of the changing frequency is limited to setting the sweep time.

The linear sweep mode shown in FIG. 3 is limited to sweeping the entire frequency range. Further, no specific frequency is completed over an entire cycle before changing to the next frequency. Thus, the frequency cannot be clearly defined as it changes.

Because of these drawbacks, the observed waveform does not completely finish a cycle at a specific frequency before changing to the next frequency. Thus, the ion ejection signal may not be related to a precise frequency. This is a serious drawback for high resolution mass spectrometry.

Figure 4:
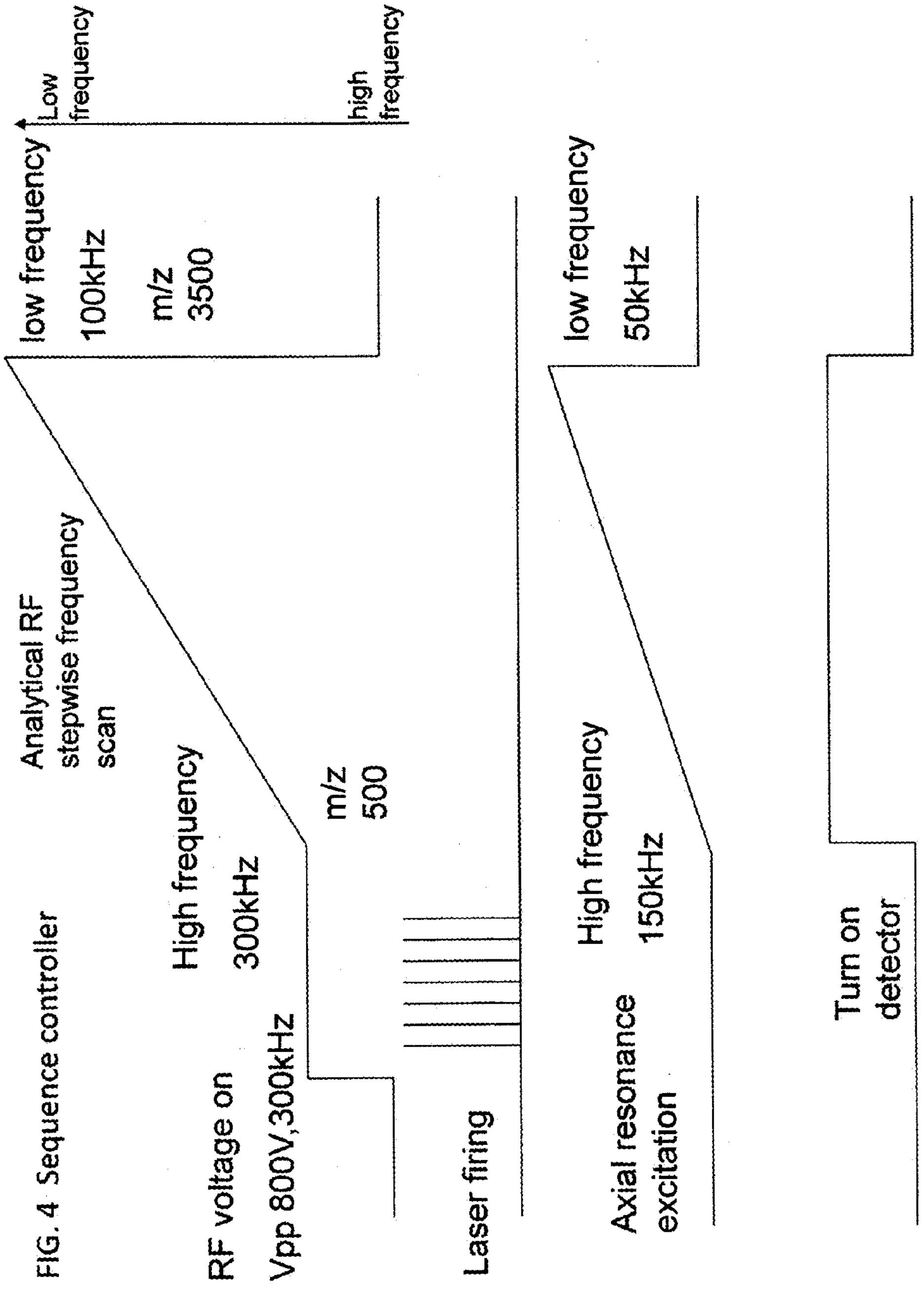
FIG. 4 shows a timing diagram for a sequence controller for a mass spectrometer.

In order to solve this problem, and to provide ultimate control over the frequency and phase of the driving RF, this disclosure provides a sequence controller for a mass spectrometer. The sequence controller can provide a timing diagram for ion detection as shown in FIG. 4. In some embodiments, a sequence controller will include a general purpose computer (PC) and a stepped function generator.

In the experimental embodiment shown in FIG. 4, the period when the detector is activated is the ion detection period. During the period when the detector is activated, the axial resonance excitation is stepped down in frequency from 150 kHz to 50 kHz, and the analytical RF is stepped down in frequency from 300 kHz to 100 kHz. Laser firing to produce ions occurs before the detection period.

In the methods of this disclosure, stepwise frequency scanning is performed by direct digital synthesis of a waveform using a sequence controller. A waveform can be produced with specific frequencies and phases at all times. The frequency of sinusoidal waveform changes can be precisely controlled, and specific frequencies can be precisely held for a fixed number of complete cycles. The step scan methods of this disclosure can provide precise control of mass spectrometer data acquisition at each individual frequency step.

In some embodiments of this disclosure, a sinusoidal waveform was generated by using an AD5930 waveform generator. The AD5930 is a general-purpose waveform generator capable of providing digitally programmable waveform sequences in both the frequency and time domain. The device contains embedded digital processing to provide a repetitive sweep of a user programmable frequency profile allowing enhanced frequency control. Because the device is pre-programmable, it eliminates continuous write cycles from a DSP in generating a particular waveform. Using the AD5930, a waveform may start from a known phase and be incremented phase-continuously allowing phase shifts to be easily determined.

Figure 5:
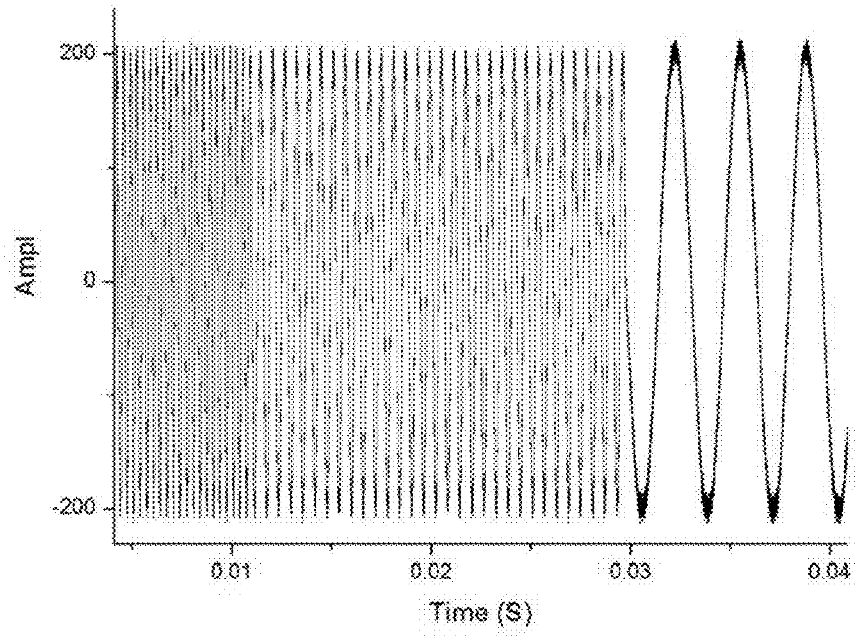
FIG. 5 shows an example of an experimental stepwise frequency scan of this disclosure. Each specific frequency in the scan is held for a fixed number of complete cycles. Each specific frequency in the scan changes continuously to the frequency in the next step. Each specific frequency in the scan starts at phase zero position.

In certain embodiments of this disclosure, a stepwise scan is used in which the frequency profile is defined by the start frequency (Fstart), the frequency increment (Δf), and the number of increments (Ninc) per scan. As shown in FIG. 5, for example, the step scan is from Fstart incrementally to Fstart+(Ninc×Δf). Each specific frequency can be held for several cycles while the detector collects and integrates the signal, therefore, the detected ions can be completely ejected at each specific frequency before changing to the next frequency. The advantage of this step scan is that the relationship of the ion signal to the ejection frequency can be precisely defined. Moreover, the step scan methods of this disclosure advantageously provide control of the phase at the start of each frequency step.

In one example, the clock of the sine wave generator was 50 MHz. An AD5930 has a 24 bit digital output. The Ninc was set to 4096 points. The number of cycles to hold each specific frequency was 120 (Ncycle). The start frequency Fstart was 300 kHz. The final frequency Fend was 100 kHz. The firmware frequency step DFreq was (300000−100000)/[4096{50E+6/(2E+24−1)}]=16.38 Hz, which was rounded to 16 Hz. The differential frequency step was 16*{50E+6/(2E+24−1)}=47.68 Hz. The final frequency was 300000−[16*{50E+6/(2E+24−1)}*4096]=104687.5 Hz.

Further, the incremental quantity Δf can be negative or positive for each step, and can be of arbitrary size so that the stepwise scan can proceed upwards or downwards in frequency by steps of arbitrary large or small size.

The frequency scanning methods of this disclosure can allow precise control, whether coarse or fine, of the differential frequency step. The frequency scanning methods of this disclosure can also provide rapid scanning at high resolution.

The frequency scanning methods of this disclosure can allow a precise relationship to be established between the ion signal and the scanning frequency.

In further embodiments, the trapping frequency can be ramped down at constant voltage amplitude.

In additional embodiments, the sinusoidal waveform was amplified by using a high voltage power operational amplifier. For example, an APEX PA94 can be used which is a high voltage, MOSFET operational amplifier designed for driving continuous output currents up to 100 mA and pulse currents up to 200 mA into capacitive loads.

Figure 6:
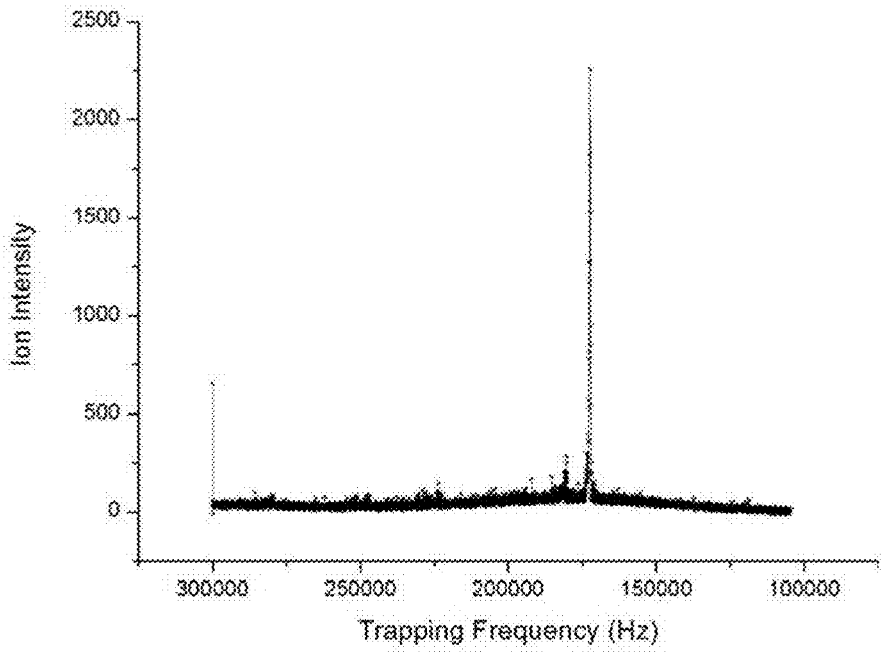
FIG. 6 shows an experimental mass spectrum of angiotensin (M.W. 1296 Da) obtained by using a stepwise scan from 300 kHz to 100 kHz. The entire frequency range was divided into 4096 steps. The specific frequency at each step was held for 120 complete cycles.

In an exemplary embodiment shown in FIG. 6, the mass spectrum of angiotensin was obtained by stepwise scan coupled with a MALDI source. The frequency differential was divided to 4096 steps, and each step was held for 120 cycles. Thus, this disclosure provides methods for obtaining the mass spectra of large biomolecules.

Figure 7:
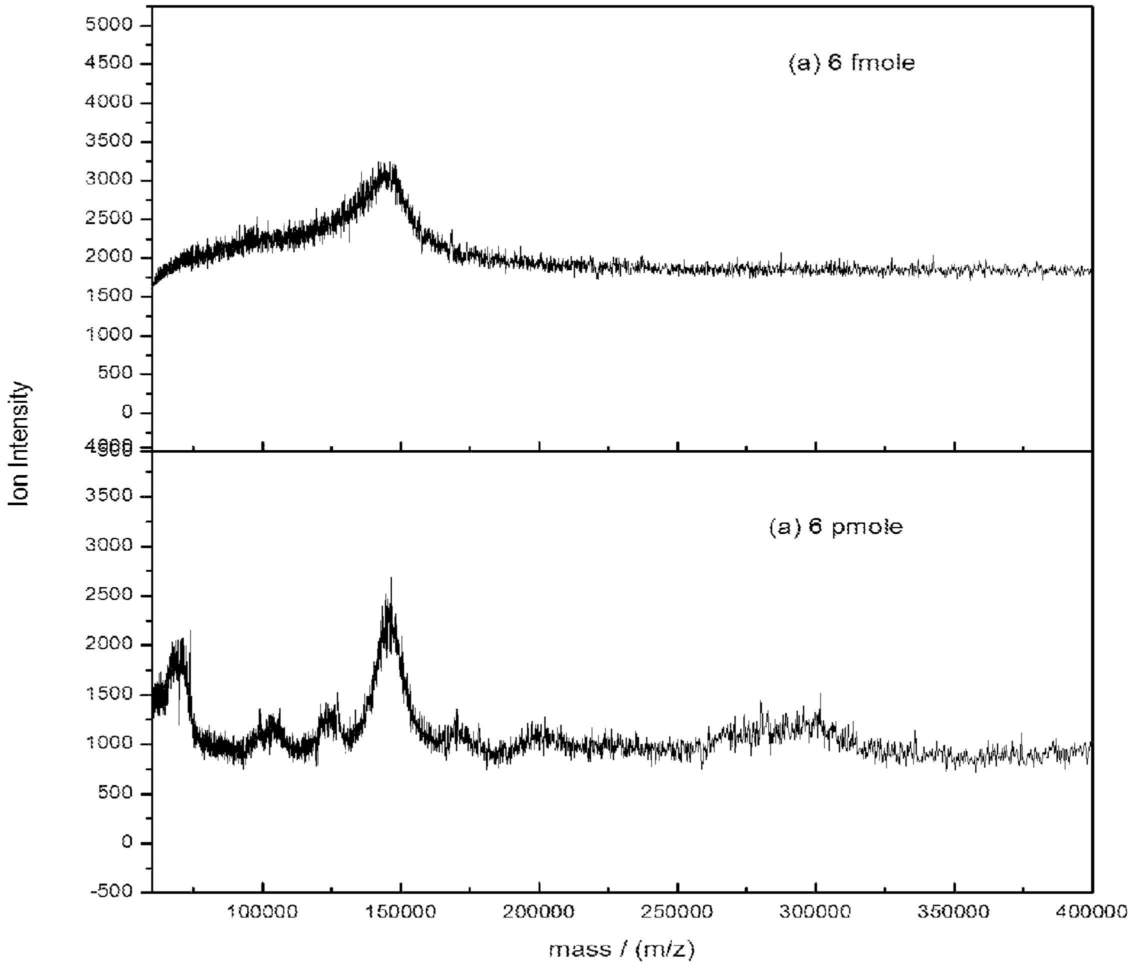
FIG. 7 shows an experimental mass spectrum of IgG (M.W. 150 kDa) obtained by using stepwise scan method.

In a further exemplary embodiment shown in FIG. 7, the mass spectrum of IgG (M.W. 150 kDa) was obtained by using stepwise scan method. Thus, this disclosure provides methods for obtaining the mass spectra of very large biomolecules.

For resonant excitation, a supplementary oscillating AC electric field was applied along the axial direction in the ion trap. The frequency of the supplementary oscillating electric field was equal to the ion secular frequency ($\omega_z$). The frequency was resonant with ion secular motion in the axial direction so that the ion kinetic energy will gain and the trajectory of the ion will expand. Finally, the ion passes through the hole of the end-cap of the ion trap. The fundamental frequency is related to the secular frequency and can be expressed as $\omega_z=(1/2)\beta_z\Omega$.

To perform mass analysis by the stepwise scan methods, the fundamental frequency can be changed linearly, and the $q_z$ was fixed at a certain value. Therefore, the frequency of the supplementary AC can be changed in proportion to the fundamental frequency by resonant excitation formula. This method uses two waveform generators, for example two AD5930, to produce two sinusoidal waveforms that can be amplified by PA94. The fundamental trapping RF can be applied to the center-ring, and resonant excitation RF is applied to the end-cap that is dipole coupling ejection. For $\beta_z$ equal to 1, the secular frequency is set to half of the fundamental frequency during the entire frequency stepwise scan.

The frequency scanning methods of this disclosure allow a precise ratio to be established between the fundamental trapping frequency and the auxiliary frequency.

In additional aspects, this invention may provide a mass spectrometer apparatus and methods capable of detecting biomolecules such as proteins, antibodies, protein complexes, protein conjugates, nucleic acids, oligonucleotides, DNA, RNA, polysaccharides and many others with high detection efficiency and resolution.

In some embodiments, the methods of this invention may be used to obtain the mass spectra of nanoparticles, viruses, and other biological components and organelles having sizes in the range of up to about 50 nanometers or greater.

In some variations, the apparatus and methods of this disclosure can also provide mass spectra of small molecule ions.

Examples of methods for ionization in mass spectrometry include laser ionization, MALDI, electrospray ionization, thermospray ionization, thermal ionization, electron ionization, chemical ionization, inductively coupled plasma ionization, glow discharge ionization, field desorption ionization, fast atom bombardment ionization, spark ionization, or ion attachment ionization.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described herein.

All publications and patents and literature specifically mentioned herein are incorporated by reference for all purposes. Nothing herein is to be construed as an admission that the invention is not entitled to antedate such disclosure by virtue of prior invention.

It is understood that this invention is not limited to the particular methodology, protocols, materials, and reagents described, as these may vary. It is also to be understood that the terminology used herein is for the purpose of describing particular embodiments only, and is not intended to limit the scope of the present invention which will be encompassed by the appended claims.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprises," "comprising", "containing," "including", and "having" can be used interchangeably.

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever.

All of the features disclosed in this specification may be combined in any combination. Each feature disclosed in this specification may be replaced by an alternative feature serving the same, equivalent, or similar purpose.

What is claimed is:

1. A method for obtaining a mass spectrum of ions with a three dimensional quadrupole ion trap mass spectrometer comprising step scanning an ion trap trapping frequency in frequency increments over a bandwidth, wherein for each step a specific frequency is held for a fixed number of complete cycles, wherein each specific frequency is changed continuously to the frequency in the next step, and wherein each specific frequency in each step starts at a phase zero position.

2. The method of claim 1, further comprising step scanning an ion trap axial excitation RF frequency in frequency increments over a bandwidth, wherein for each step a specific axial frequency is held for a fixed number of complete cycles, wherein each specific axial frequency is changed continuously to the axial frequency in the next step, and wherein each specific axial frequency in each step starts at a phase zero position.

3. The method of claim 1, wherein the fixed number of complete cycles is from 10 to 1,000,000.

4. The method of claim 1, wherein the frequency increment is from 1 to 256 Hz.

5. The method of claim 1, wherein the ions are ionized molecules or fragments of a larger molecule or structure selected from macromolecules, biomolecules, organic polymers, nanoparticles, proteins, antibodies, protein complexes, protein conjugates, nucleic acids, oligonucleotides, DNA, RNA, polysaccharides, viruses, cells, and biological organelles.

6. The method of claim 1, wherein the ions have a mass of from about 1 kDa to about 200 kDa.

7. A method for obtaining a mass spectrum of ions comprising:

trapping the ions in a quadrupole ion trap comprising a center-ring electrode and two end-cap electrodes;

applying a first specific frequency of RF to the center-ring electrode for a first number of complete cycles of the first specific frequency of RF; and applying a second specific frequency of RF to the center-ring electrode for a second number of complete cycles of the second specific frequency of RF, wherein the second specific frequency of RF is applied beginning at phase zero, and wherein the second specific frequency of RF differs in frequency from the first specific frequency of RF by an amount $\Delta f_1$.

8. The method of claim 7, wherein $\Delta f_1$ is from 1 to 256.

9. The method of claim 7, wherein the first and second number of complete cycles are each independently from 10 to 1,000,000.

10. The method of claim 7, further comprising additional steps of applying a specific frequency of RF to the center-ring electrode for a number of complete cycles of the specific frequency of RF, wherein each additional specific frequency of RF is applied beginning at phase zero, and wherein the each additional specific frequency of RF differs in frequency from the previous specific frequency of RF by an amount $\Delta f_n$.

11. The method of claim 10, wherein $\Delta f_n$ is from 1 to 256.

12. The method of claim 7, further comprising applying a first specific axial frequency of RF to the end cap electrodes for a first number of complete cycles of the first specific axial frequency of RF; and applying a second specific axial frequency of RF to the end cap electrodes for a second number of complete cycles of the second specific axial frequency of RF, wherein the second specific axial frequency of RF is applied beginning at phase zero, and wherein the second specific axial frequency of RF differs in frequency from the first specific frequency of RF by an amount $\Delta f_1$.

13. The method of claim 7, wherein the ions are ionized molecules or fragments of a larger molecule or structure selected from macromolecules, biomolecules, organic polymers, nanoparticles, proteins, antibodies, protein complexes, protein conjugates, nucleic acids, oligonucleotides, DNA, RNA, polysaccharides, viruses, cells, and biological organelles.

14. The method of claim 7, wherein the ions have a mass of from about 1 kDa to about 200 kDa.

15. The method of claim 7, wherein the ions are generated by MALDI, electrospray ionization, laser ionization, thermospray ionization, thermal ionization, electron ionization, chemical ionization, inductively coupled plasma ionization, glow discharge ionization, field desorption ionization, fast atom bombardment ionization, spark ionization, or ion attachment ionization.

16. An ion trap mass spectrometer for obtaining a mass spectrum of ions, the ion trap mass spectrometer comprising:

a three dimensional quadrupole ion trap;

a sequence controller comprising a programmable waveform generator for synthesizing a step scan waveform of a trapping frequency in frequency increments over a bandwidth, wherein for each step a specific frequency is held for a fixed number of complete cycles, wherein each specific frequency is changed continuously to the frequency in the next step, and wherein each specific frequency in each step starts at phase zero position; and a charge detector.

17. The ion trap mass spectrometer of claim 16, wherein the programmable waveform generator is programmable for synthesizing a step scan waveform of an axial RF frequency in frequency increments over a bandwidth, wherein for each step a specific axial frequency is held for a fixed number of complete cycles, wherein each specific axial frequency is changed continuously to the axial frequency in the next step, and wherein each specific axial frequency in each step starts at phase zero position.

18. The ion trap mass spectrometer of claim 16, wherein the fixed number of complete cycles is from 10 to 1,000,000.

19. The ion trap mass spectrometer of claim 16, wherein each frequency increment is independently from 1 to 256 Hz.

20. The ion trap mass spectrometer of claim 16, wherein the ions are ionized molecules or fragments of a larger molecule or structure selected from macromolecules, biomolecules, organic polymers, nanoparticles, proteins, antibodies, protein complexes, protein conjugates, nucleic acids, oligonucleotides, DNA, RNA, polysaccharides, viruses, cells, and biological organelles.

21. The ion trap mass spectrometer of claim 16, wherein the ions have a mass of from about 1 kDa to about 200 kDa.

22. The ion trap mass spectrometer of claim 16, wherein the ions are generated by MALDI, electrospray ionization, laser ionization, thermospray ionization, thermal ionization, electron ionization, chemical ionization, inductively coupled plasma ionization, glow discharge ionization, field desorption ionization, fast atom bombardment ionization, spark ionization, or ion attachment ionization.

* * * * *